Sept. 26, 1961 — W. E. BELKE — 3,001,926
ELECTROPLATING RACKS
Filed Jan. 4, 1960 — 2 Sheets-Sheet 1
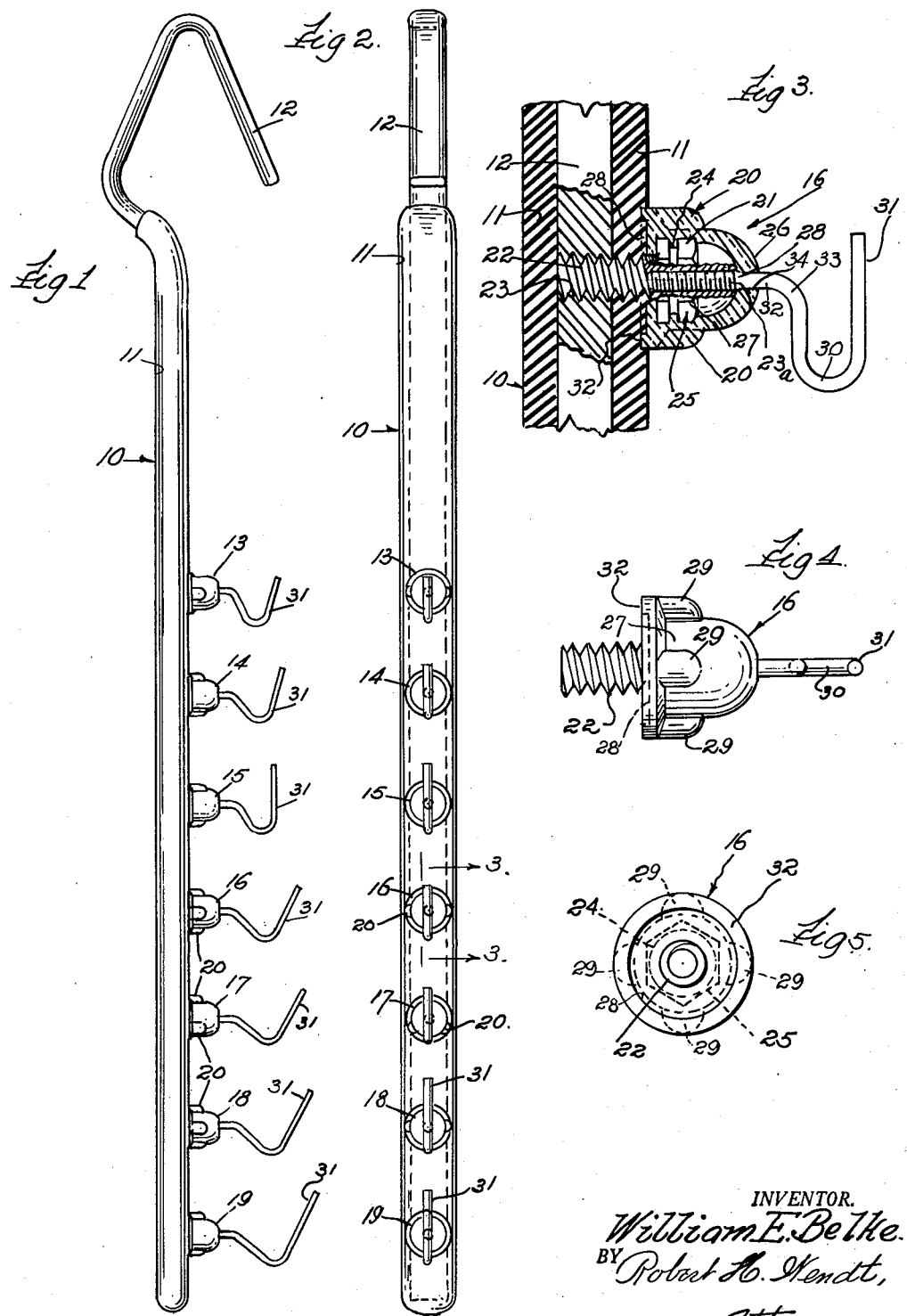
INVENTOR.
William E. Belke
BY Robert H. Wendt,
Attorney.

Sept. 26, 1961   W. E. BELKE   3,001,926
ELECTROPLATING RACKS
Filed Jan. 4, 1960   2 Sheets-Sheet 2
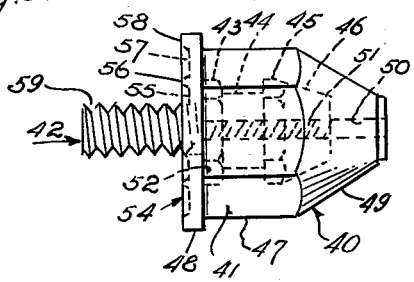
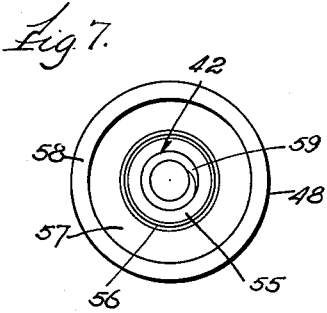
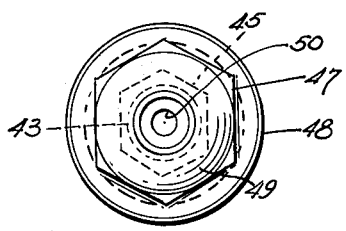
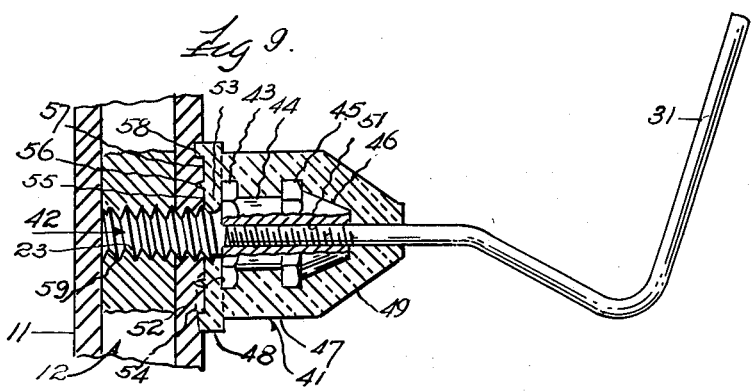
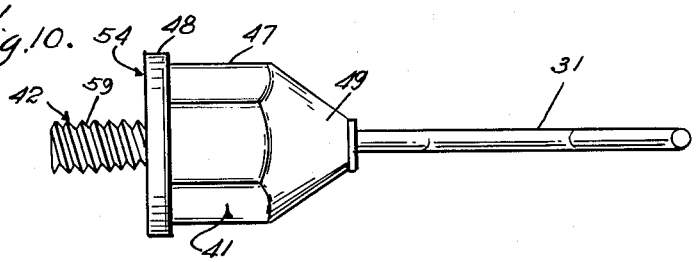
INVENTOR.
William E. Belke
BY Robert H. Wendt,
Attorney.

United States Patent Office 3,001,926
Patented Sept. 26, 1961

3,001,926
ELECTROPLATING RACKS
William E. Belke, Chicago, Ill., assignor to Belke Manufacturing Co., Chicago, Ill., a corporation of Illinois
Filed Jan. 4, 1960, Ser. No. 239
2 Claims. (Cl. 204—297)

The present invention relates to electroplating racks, and is particularly concerned with the provision of improved means of effecting a good electrical connection between any of a plurality of articles supporting tips and a vertical spine covered with insulating compound, while at the same time effecting a liquid-tight seal about the nut and bolt which support the tip on the spine.

One of the objects of the invention is the provision of an improved tip assembly for electroplating articles in which the tip is supported in a threaded bolt which can be threaded directly into a threaded bore in a spine, and in which the head of the bolt is covered and anchored in an overall covering of a suitable plastic adapted to exclude the electrolyte from the threads of the tip and adapted to engage the insulating compound on the spine and to exclude the electrolyte from the threads of the bolt and the bore in the spine.

Another object of the invention is the provision of an improved supporting bolt for rack tips, the bolt having a threaded shank and a non-circular head, and having an axial bore in the head, into which a tip may be threaded to effect a good electrical connection, and in which the entire head, including its back surface, is covered with a molded coating of plastic, such as modified "Marlex," "Lucite," or "Teflon."

Another object of the invention is the provision of such a plastic covered nut, which has a cylindrical body and a radially extending flange, the under side of the flange being provided with a circular rib adapted to establish a seal with the insulating compound that covers the spine, to which the bolt is to be attached.

Another object of the invention is the provision of an improved anchor between the molded plastic covering and the head of the nut by having the nut provided with an annular groove into which the compound is pressed to provide such an anchor that the molded covering will not jump off the nut or head when a wrench is applied.

Another object of the invention is the provision of an improved shape for such plastic coverings, in which the cylindrical body is provided with two or three or four radially extending ribs that effect a good fit in the socket of a socket wrench, and in which the plastic covering has a spherically shaped end provided with an axial bore leading to the bore in the head of the nut, and the size of the bore is such that it is substantially closed and sealed when the shank of the contact tip is screwed into the bore of the head of the bolt.

Another object of the invention is the provision of an improved contact tip assembly in which the head of a threaded bolt is provided with a bore for the tip, and the head is covered with a plastic overall of such hardness that it is adapted to withstand the application of a socket wrench; and the sharp circular edge on its rear face is adapted to penetrate into the plastisol insulating covering that has already been applied to a spine.

Another object of the inventon is the provision of an improved contact tip assembly in which the head of a threaded bolt is provided with a threaded bore for the tip and the head is covered with a plastic overall having a tight sliding fit with the shank of the tip to exclude electrolyte, and having a body which is adapted to fit a socket wrench, and having a rear face covering the nut, and provided with a plurality of relatively narrow ridges adapted to penetrate into the plastisol insulating covering that has already been applied to a spine for providing a tight seal between the plastic insulation and the plastisol covering, preventing the access of electrolyte to the threaded shank of the bolt.

Other objects and advantages of the invention will be apparent from the following description and the accompanying drawings, in which similar characters of reference indicate similar parts throughout the several views.

Referring to the two sheets of drawings accompanying the specification,

FIG. 1 is a side elevational view of a rack spine equipped with a plurality of different types of contact tips, each of which is supported by a plastic covered bolt having a bare threaded shank embodying the invention;

FIG. 2 is a front elevational view taken from the right of FIG. 1;

FIG. 3 is a fragmentary sectional view taken on the plane of the line 3—3 of FIG. 2, looking in the direction of the arrows;

FIG. 4 is a side elevational view of the supporting bolt and tip of FIG. 3, taken from the top of FIG. 3;

FIG. 5 is a rear elevational view of the bolt, taken from the left of FIG. 4;

FIG. 6 is side elevational view of a plastic covered bolt head, illustrating a preferred modification;

FIG. 7 is a rear elevational view taken from the left of FIG. 6;

FIG. 8 is a top plan view taken from the right of FIG. 6;

FIG. 9 is an axial sectional view similar to FIG. 3, showing this modified construction with the lowermost tip of FIG. 1;

FIG. 10 is a top plan view of the bolt and tip assembly of FIG. 9 taken from the top of FIG. 9.

Referring to FIGS. 1 and 2, 10 indicates in its entirety a standard rack spine, the main body of which is covered overall with an insulating plastic covering 11, such as, for example, plastisol.

The rack spine 10 has a bare upper V-shaped hook 12 and the spine is preferably constructed of copper for high conductivity and is provided with a multiplicity of regularly spaced threaded bores extending through the body of the spine 10 to be equipped with various types of contact tips.

The bores 23 are preferably formed in the spine 10 and threaded before the coating of insulating compound is applied by immersion; and after it is applied the bores 23 may be cleaned out by retapping them or the threaded bores may be filled with dummy plugs of metal threaded into each bore and removed after the plastic coating is applied.

The tip assembly 16, for example, is shown in FIG. 3; and all the others are of similar construction except that the plastic covering may be provided with two, three, or four ribs, as shown at 19, 17, and 18 in FIG. 1.

The bolts which support the tips are provided with a threaded shank 22 and a hexagonal head 21, which as a sperical end portion.

The bolt head 21 is provided with the threaded bore 23a for receiving the threaded shank 28 of the tip member 16 or any of the other tip members, as indicated by the numbers 13–19 in FIG. 1.

The hexagonal head 21 is provided between its ends with an annular groove 24 extending into the flat portions 25 of the hexagonal head and providing an anchorage for the plastic covering 20, which is molded over all of the head of the bolt and comprises modified "Marlex," "Lucite," or "Teflon."

The plastic covering for the head 21 comprises a partially spherical end portion 26, a cylindrical side wall portion 27, and a flat end portion 28, which covers the head over all and is provided with an annular rib 32, extending from the back of the head covering 20 and adapted to penetrate the softer insulation 11, such as plastisol, which covers the body of the spine 10.

The relatively harder insulating covering of modified "Marlex," "Lucite," or "Teflon" is adapted to effect a liquid-tight seal with the softer insulation plastisol when the shank 22 of the bolt is threaded into the threaded bore 23.

The cylindrical side wall portion 27 of the covering 20 is provided with two, three, or four laterally projecting ribs 29 equally spaced from each other and adapted to be engaged by the recesses in the walls of a socket wrench, which may be applied to the covering 20 for screwing the bolt shank 22 into the threaded bores 23 of the spine sufficiently to cause the annular rib 32 to effect a liquid-tight seal with the insulation of the spine.

No further rubber washers or the like are required; and the rib 32 is also found to make a liquid-tight seal when engaging a harder surface.

The tip member 16 is preferably constructed of copper wire of suitable size and has a smooth body 32, which is bent downwardly at 33 and upwardly again at 30, being provided with an upwardly turned end 31.

The angularity and length of the end portions and the angularity of the bends at 33 and 30 may be varied to suit the requirements of the user for supporting articles to be electroplated; but the tip illustrated at 16 is an example of a preferred form.

Referring to FIG. 6, in this modification the bolt is indicated in its entirety by the numeral 40 and is provided with a molded plastic covering of modified "Marlex," "Lucite," or "Teflon," indicated at 41, which covers the head of the bolt and is adapted to effect a liquid-tight seal when engaged with the plastisol covering insulation 11 on a spine 12 of electrical conducting metal, such as brass or copper provided with a plurality of threaded bores 23 for receiving the threaded shanks of the bolts, such as the threaded shank 42 of the bolt in FIG. 6.

The plastic covering 41 covers the head overall and extends into engagement with the threaded shank 42 on the rear side of the head, preventing electrolyte from attacking the head of the bolt.

The rear side of the head is indicated at 52; and the head is provided with a hexagonal portion 43, a groove 44, and a second hexagonal portion 45. The head may be frusto-conical or rounded at 46, and is provided with a threaded bore 51 for receiving the threaded shank of the tip 31, which is preferably made of wire (such as brass or copper; and the cylindrical body of the wire has a tight sliding fit with the bore 50 in the plastic covering 41.

The plastic covering 41 has an external hexagonal body 47 and an annular outwardly projecting flange 48 at its base. At its other end the plastic covering may be tapered or frusto-conical at 49.

The rear side of the plastic covering 41 is preferably provided with a layer of plastic 53 covering the nut surface 52 and a plurality of circular ridges adapted to engage in the plastisol 11.

For example, the V-shaped ridge 56 is spaced from a flat portion 55 surrounding the shank 42; and there is a second flat portion 57 surrounding the ridge 56 and a second relatively narrow ridge 58 surrounding the flat portion 57.

As shown in FIG. 9, the threads of the shank 42 engage in the threaded bore in the spine 12; and when actuated by a socket wrench, the covered head 40 is adapted to be driven tightly into the threaded bore until the ridge 58 engages in the plastisol 11 and effects a liquid-tight seal.

The ridge 58 is adapted to entrap plastisol against the flat surface 57 and the inner ridge 56 and the flat surface 55, thus effecting a tighter seal; and in the event that leakage might occur at the ridge 58, it is prevented by the second ridge 56 and the tight engagement of the head with the plastisol that is entrapped and engaged by the surfaces 57 and 55 and the inner ridge 56.

As distinguished from devices of the prior art, the present relatively hard plastic covering 41 is securely anchored in the metal head by being engaged in the groove 44 so that it cannot be stripped off the head; and the plastic covering 41 is prevented from rotating on the head of the bolt by engaging the hexagonal surfaces 43 and 45, which prevent it from rotating on the head.

As the body 32 of each tip member has a tighter fit in a smaller hole 34 in the end of the insulating covering, this may also exclude the electrolyte at this point; and the breakage of tips at the point where the tip emerges from the threaded bore is eliminated.

The present tip assemblies are adaptable for supporting many different kinds of articles to be electroplated, and may be manufactured much more economically than the complicated tip assemblies of the prior art, which require tapered bushings and bushings with sharp radial teeth to effect a good contact with the spine and rubber cups or washers for effecting a liquid-tight seal with the insulation of the spine.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. An electroplating tip assembly, comprising a smooth cylindrical wire of high electrical conductivity formed with a straight shank and a supporting hook at its outer end, the said shank having a threaded portion at its extreme end and a supporting bolt provided with a head and a threaded shank of larger size than the tip shank, the head of said bolt being formed with a threaded bore complementary to and receiving all of the threaded ends of said tip, said head also having a pair of radially projecting, non-circular flanges separated by an annular groove of rectangular cross section, and the said head having a tapered end portion opposite to said shank and a molded plastic insulating member covering said head on its rear side and extending into engagement with the threaded shank of said bolt, said insulating member having a non-circular body having its inner portion engaging said non-circular flanges on said head and extending into said rectangular groove, said body also engaging and covering the tapered portion of said head and extending outwardly beyond the end of said head, where said body has a tapered end portion and a centrally located cylindrical bore registering with the threaded bore in said head and having sealing engagement with the cylindrical wire of said tip outwardly of the threaded end portion of the tip shank, the said body also being provided on its rear side with a cylindrical outwardly projecting flange provided at its outer edge with a rear projecting annular flange, forming a central depression surrounding the threaded shank of the bolt, said annular flange being adapted to engage in and deform a plastisol covering on a spine, forming an annular groove in the plastisol to effect a seal therewith, the said outer non-cylindrical surface of said member being adapted to cooperate with a wrench, for driving or removing the threaded shank of the bolt from the spine without stripping the insulating member from the head.

2. An electroplating tip assembly according to claim 1, in which a plurality of said tips are supported by similar threaded bolts having insulating members covering their heads, and having the threaded shanks of said bolts threaded into a spine in threaded bores, the said spine having a layer of plastisol insulation except at the openings of said bores on one side and closing the openings of said bores on the other side, and the rear side of said insulating member being provided, in addition to an annular sealing member at its outer edge, with a second annular V-shaped sealing ridge engaging in the plastisol and improving the seal therewith.

References Cited in the file of this patent

Practical Handbook on Electro-Plating, Canning, 11th edition, 1932, page 152.

Metal Finishing, November 1949, page 76.